(12) United States Patent
Bigeh

(10) Patent No.: US 8,910,914 B2
(45) Date of Patent: Dec. 16, 2014

(54) MOUNT FOR ELECTRONICS EQUIPMENT

(75) Inventor: Fred Bigeh, Wilsonville, OR (US)

(73) Assignee: Audix Corporation, Wilsonville, OR (US)

( * ) Notice: Subject to any disclaimer, the term of this patent is extended or adjusted under 35 U.S.C. 154(b) by 212 days.

(21) Appl. No.: 13/438,910

(22) Filed: Apr. 4, 2012

(65) Prior Publication Data
US 2013/0264450 A1    Oct. 10, 2013

(51) Int. Cl.
*A47F 5/00*    (2006.01)

(52) U.S. Cl.
USPC .............. 248/288.31; 248/288.51; 248/188.1; 403/76; 403/90; 403/114; 403/122

(58) Field of Classification Search
USPC ........ 248/177.1, 187.1, 288.31, 188.1, 188.2, 248/288.51; 403/76, 78, 90, 114, 122
See application file for complete search history.

(56) References Cited

U.S. PATENT DOCUMENTS

| | | | | |
|---|---|---|---|---|
| 2,670,228 A | * | 2/1954 | Pagliuso | 403/137 |
| 2,859,983 A | * | 11/1958 | May | 285/90 |
| 4,974,802 A | * | 12/1990 | Hendren | 248/181.1 |
| 5,072,907 A | * | 12/1991 | Vogt | 248/181.1 |
| 6,352,228 B1 | * | 3/2002 | Buerklin | 248/181.1 |
| 7,300,028 B2 | * | 11/2007 | Vogt | 248/181.1 |
| 7,993,069 B2 | * | 8/2011 | Persson | 403/56 |
| 8,282,055 B2 | * | 10/2012 | Burklin | 248/187.1 |
| 8,753,031 B2 | * | 6/2014 | Stefan et al. | 403/135 |

OTHER PUBLICATIONS

Copending U.S. Appl. No. 13/959,141, filed Aug. 5, 2013, naming the same inventor and same applicant as the present invention.

* cited by examiner

*Primary Examiner* — Todd M Epps
(74) *Attorney, Agent, or Firm* — Hancock Hughey LLP

(57) ABSTRACT

A mount that is useful for mounting electronics equipment such as audio or video equipment such as a microphone or a camera in a desired orientation has first and second interconnected body members that retain a swivel adapter that is movable in a ball and socket swivel joint relative to the body members. The body members rotated on threaded connections to thereby adjust the tightness of the swivel adaptor retained between the body members. A stop prevents inadvertent disassembly of the assembled mounting apparatus.

16 Claims, 2 Drawing Sheets

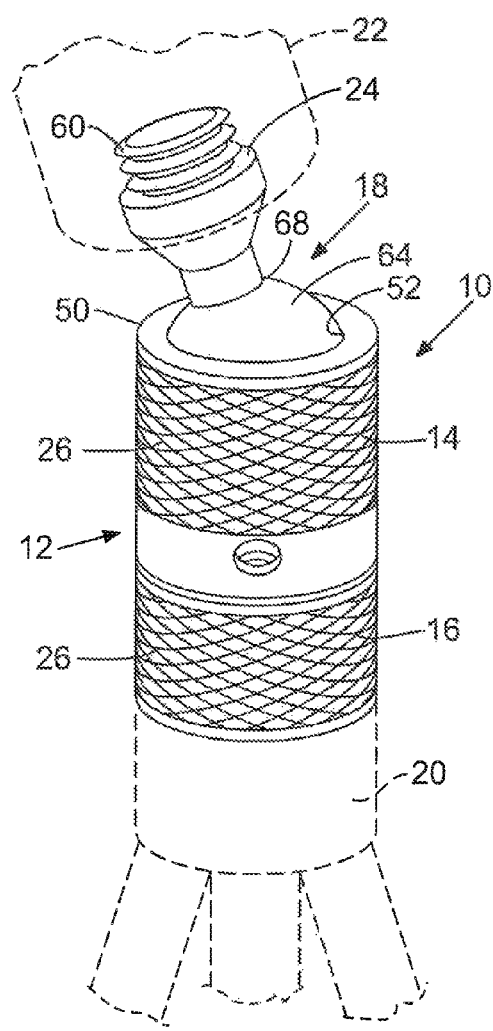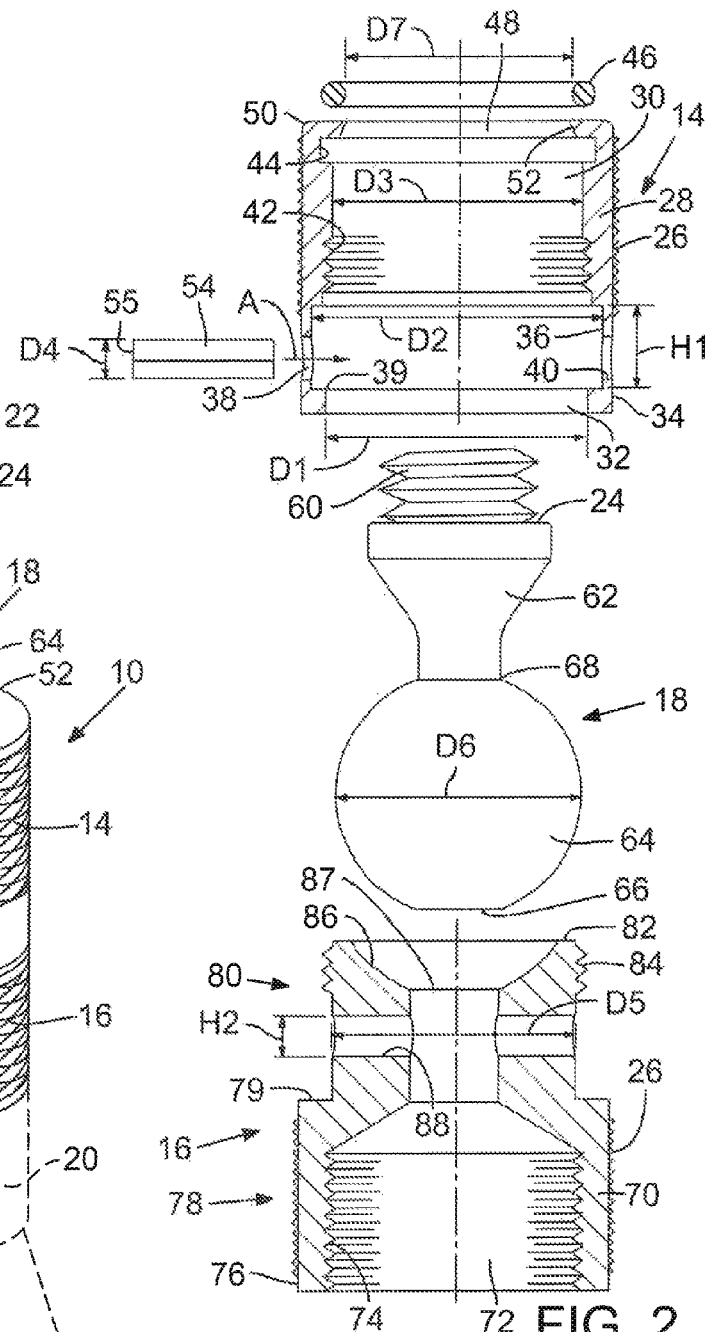

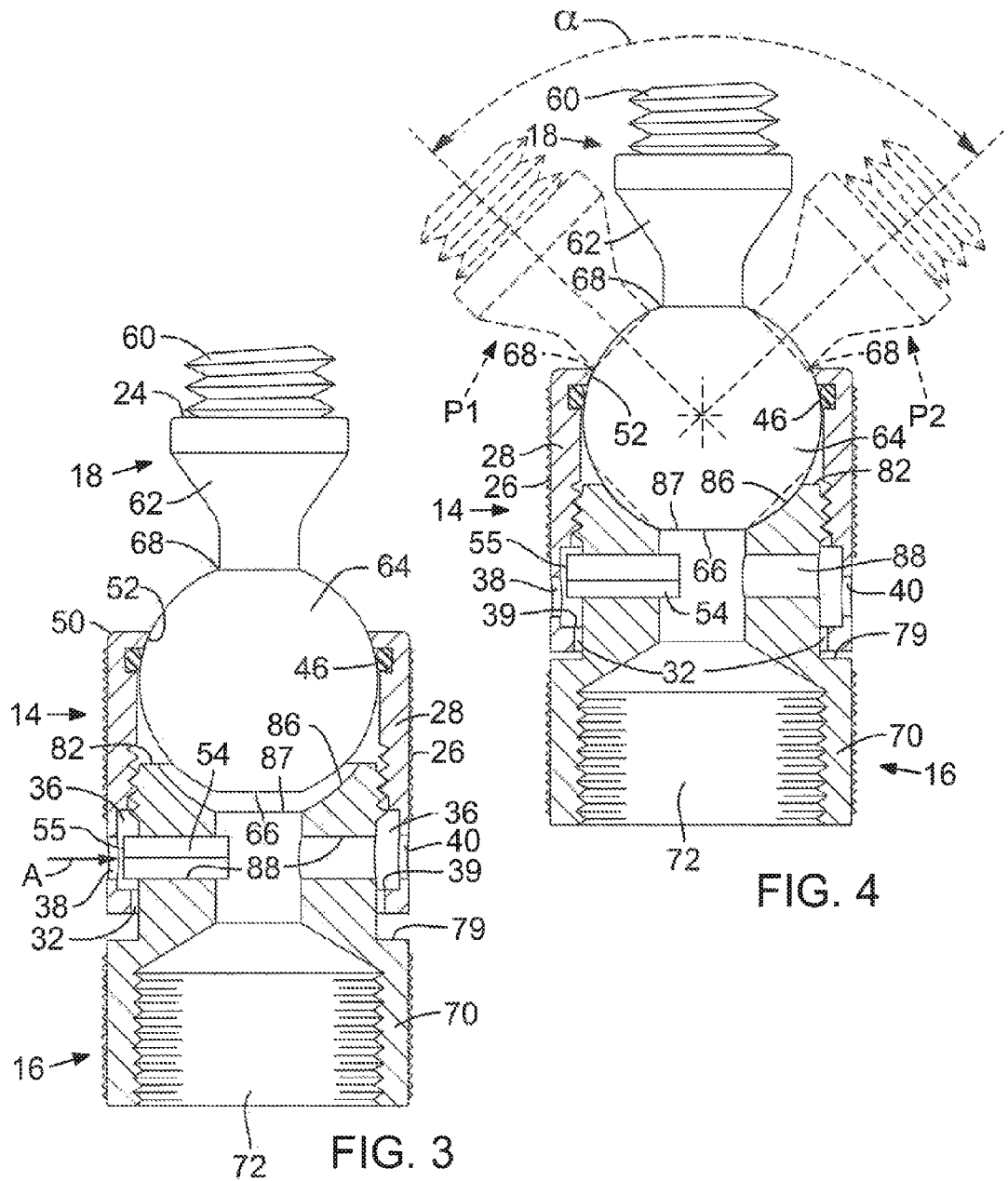

MOUNT FOR ELECTRONICS EQUIPMENT

TECHNICAL FIELD

The present invention relates to an apparatus for mounting electronics equipment including audio equipment such as microphones or video equipment such as cameras, and more specifically is a swivel mount that utilizes a ball and socket pivot for improved control over audio equipment positioning.

BACKGROUND

Properly positioning audio equipment such as a microphone is a constant challenge in order to maximize the performance of sound reproduction. Depending on the intended use of a microphone, different mounting equipment may be needed. For example, there are different mounting considerations and requirements for mounting a microphone that is being used to amplify sound emanating from a drum than exist when using a microphone to amplify sound that is originating at a distance from the microphone. Regardless of what kind of microphone is being used and what instrument or device is being amplified through the microphone, it is always important to have the microphone oriented relative to and spaced apart from the instrument in appropriate manners. Likewise, desirable positioning of video equipment such as cameras requires flexibility and adjustability.

Given the great variety of mounting situations, there are many types and designs of microphone and camera mounts on the market today. Many of these mounts allow for adjustable positioning of the microphone or camera on the mounting device. However, there is a continuing need for mounting apparatus for a microphone or other audio and video equipment that is adaptable to a variety of different mounting needs and which provides for a broad range of control over microphone positioning.

The invention described herein and illustrated in the drawings is defined by a mounting apparatus that allows for significant freedom and ease of movement for an electronics device such as a microphone or camera attached to the mount so that the microphone may be properly positioned in order to maximize performance of the mounted electronics device. The mounting apparatus has first and second interconnected body members that retain a swivel adapter that is movable in a ball and socket swivel joint relative to the body members. The body members rotated relative to one another to thereby adjust the tightness of the swivel adaptor.

A stop mechanism prevents inadvertent disassembly of the assembled mounting apparatus.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a perspective view of a microphone mount according to the present invention, illustrating the mount with portions of an exemplary stand and a shock mount of the types that are typically used with the inventive mount, the stand and the shock mount are shown in phantom lines.

FIG. 2 is a side elevation, exploded and partial cross sectional view of the microphone mount shown in FIG. 1, illustrating the component parts of the mount.

FIG. 3 is side elevation and partial cross sectional view of the microphone mount shown in FIG. 2, with the component parts assembled.

FIG. 4 is a side elevation view of the microphone mount of the present invention similar to FIG. 3 and illustrating movement of the microphone attachment portion of the mount.

DETAILED DESCRIPTION OF ILLUSTRATED EMBODIMENTS

A first illustrated embodiment of a mount 10 according to the present invention is shown in the drawing figures. Mount 10 is defined by a cylindrical main body 12 that comprises an upper barrel member 14, a lower barrel member 16 that is threaded into the upper barrel member and a swivel adapter 18 (also referred to herein as a swivel member) that is mounted and retained in the upper barrel member 14. Each of these components is described in detail below along with a detailed description of how the components interact when they are assembled and used. While the mount 10 is described primarily with respect to its use to mount a microphone, the invention is useful for mounting a vast variety of electronics equipment including cameras and the like.

As shown in FIG. 1, the mount 10 is used with a positioning device 20 such as the tripod shown in generically with dashed lines and identified generally in FIG. 1 with reference number 20. The tripod 20 is threaded into an internally threaded opening in the lowermost end of the lower barrel member 16. As also shown in FIG. 1, the mount is used with an adaptor 22 that is threaded onto the distal end 24 of swivel adapter 18. Adapter 22 serves to attach a microphone (not shown) or some other type of audio equipment to the mount 10. As detailed below, the upper barrel member 14 and lower barrel member 16 are rotatable relative to one another in order to tighten and loosen the swivel member 18 relative to main body member 12. As such, the outer surfaces of both the upper barrel member 14 and lower barrel member 16 are preferably knurled, as shown with knurled surfaces 26.

It will be understood that any number of positioning devices 20 that could be used with mount 10—the purpose of the positioning device is to locate the mount 10 in a desired position relative to another object. Likewise, there is any number of adapters 22 that could be threaded onto the swivel adapter—the purpose of the adapter is to interconnect the microphone or other audio equipment to the mount 10. A typical device that serves as adapter 22 is a shock mount adapter, which is a device that resiliently mounts a microphone—the shock mount adapter holds the microphone and also attaches to the mount 10 as shown in FIG. 1. Similarly, in some instances a microphone may be directly attached to the mount 10 by threading the distal end 24 of the swivel adapter 18 directly into a threaded opening in the microphone. It will further be appreciated that the manner of attaching both the positioning device 20 and the adapter 22 illustrated herein is meant to be exemplary only and that other structural devices may be utilized to attach the positioning device and adaptor. More specifically, rather than the threaded attachments such as 60 and 72 described and shown herein, a positioning device 20 or an adapter 22 may be mounted to mount 10 with an attachment such as a bayonet mount and other equivalent structures.

Relative directional terms are used at times herein to describe parts of the invention and relative positions of the component parts. The position of the mount 10 shown in FIG. 1 is used as a reference for the naming convention used herein. Thus, with reference to FIG. 1, the adapter 22 is considered to be at the "upper" end of mount 10, and the positioning device 20 is thus at the "lower" end. Other relative directional terms correspond to this convention: "upper" refers to the direction above and away from "lower", in "inner" generally refers to the direction toward the interior of mount 10, and so on. It will be appreciated that in use, mount 10 need not be used in the vertical orientation shown in FIG. 1, but may be positioned in any desired orientation.

Turning now to the exploded view of FIG. 2, each of the primary components of mount 10 will be described, beginning with upper barrel member 14, which is shown in cross section. Upper barrel member 14 is a generally hollow cylindrical body 28 with an open interior 30 and an outer knurled surface 26. An opening 32 is formed in the lower end 34 of body 28. Opening 32 has a diameter D1. Immediately adjacent opening 32, moving in the upward direction of FIG. 1, is an annular slot 36 having a diameter D2 and having opposed and axially aligned openings 38 and 40 that open into annular slot 36 through the side of body 28. The "height" of annular slot 36 is defined and shown as "H1". The inner annular edge of slot 36 is identified with reference number 39—D1 is the diameter of opening 32 at inner annular edge 39. Continuing in the "upward" direction through body 28, adjacent annular slot 36 is an internally threaded portion 42 that has a diameter D3. Upward of threaded portion 42 is an annular shelf 44 that is adapted for receiving and retaining a rubber O-ring 46. An opening 48 is formed in the upper end 50 of body 28 and the inner-facing walls 52 that define opening 48 are formed to define a curved or radiused surface having the same radius of curvature as the outer surface ball portion of swivel adapter 18, as illustrated and as detailed below. The diameter of opening 48 at its uppermost rim (i.e., at its narrowest point) is shown as D7. The interior diameter of O-ring 46 is equal to D7.

A pin 54 having a first, outermost end 55 is shown as being adapted for insertion through openings 38 or 40 and thus into annular slot 36. The pin 54 has a diameter D4. D4 is less than H1 and the pin may be inserted through opening 38 or 40 as shown with arrow A.

Relative dimensions are important to the invention for the reasons to be detailed. With reference to the dimensions just mentioned with regard to upper barrel member 14:

D1=D3

D1 and D3<D2

D7<D3

H1>D4

Swivel adapter 18 (swivel member 18) is preferably a monolithic member that has a threaded portion 60 extending from the distal end 24, although adapter 18 may be formed in multiple parts and as noted above, threads 60 may be replaced with any appropriate and equivalent mounting structure. With returning reference to FIG. 1, threaded portion 60 is adapted for attachment to the adapter 22. A shank portion 62 interconnects the distal end 24 with the ball 64, which has a flattened lower end 66 and which has an outer surface that defines a radius of curvature. The diameter of swivel member 18 at ball 64 is D6. Shank portion tapers from its widest diameter at distal end 24 to its narrowest diameter at the junction 68 where the shank connects to the ball 64. The swivel member 18 defines a member that is retained in the assembled mount 10 with the ball retained in the interior of the assembled upper and lower barrel members and with an arm defined by shank portion 62 extending through the opening 48 and adapted for mounting audio equipment.

Again, relative dimensions are important to the invention. With reference to the dimensions just mentioned with regard to swivel member 18 and also upper barrel member 14:

D6<D1

D6>D7

Lower barrel member 16 is also a generally hollow cylindrical body 70 with an open interior 72 and an outer knurled surface 26. An internally threaded opening 74 is formed in the lower end 76 of body 70. As described above, the threaded opening is adapted for attaching the positioning device 20 as shown in FIG. 1

The exterior of body 70 defines a lower portion 78 that is knurled and which has a greater diameter than an immediately adjacent upper portion 80, which has a smaller diameter than lower portion 78 and which is defined by an annular shelf 79. The diameter of upper portion 80 is shown as D5. The uppermost end 82 of body 70 is threaded at an externally threaded portion 84 and the open interior 72 of body 70 at uppermost end 82 defines a semispherical seat 86 that has the same radius of curvature as ball 64 and which is adapted to receive ball 64 in the assembled mount 10 and to thus act as a ball and socket type of connection. The semispherical seat 86 thus defines a surface on which the ball moves as the swivel member 18 moves. The semispherical seat 86 includes a flattened portion 87 at the center of the semisphere.

A bore 88 extends through body 70 in upper portion 80. Bore 88 has a height H2.

As noted above, relative dimensions are important to the invention. With reference to the dimensions just mentioned with regard to lower barrel member 16 and also upper barrel member 14:

D5<D1 and D3

H2=D4

Mount 10 is shown as an assembled unit in FIGS. 3 and 4. With reference first to FIG. 3, mount 10 is assembled by first inserting the "upper" end of swivel adapter 18 (i.e., the end with threaded portion 60) through opening 32 in the lower end 34 of upper barrel member 14 until the ball 64 makes contact with rubber O-ring 46. Because D6—the diameter of ball 64—is greater than D7—the diameter of opening 48 at its narrowest point, swivel adapter 18 cannot pass through opening 48 and is thus positioned in the open interior 30 of upper barrel member 14.

With the swivel adapter 18 inserted as just described into the open interior 30 of the upper barrel member 14, the externally threaded portion 84 of lower barrel member 16 is threaded into the internally threaded portion 42 of upper barrel member 16, thus capturing swivel member 18 in the open interior 30 of upper barrel member 14. As the lower barrel member 16 is threaded into the upper barrel member 14, the semispherical seat 86 formed in lower barrel member 16, which as noted has the same radius of curvature as ball 64, mates with the ball and thus pushes the ball upwardly and against O-ring 46, compressing the O-ring and at the same time causing it to be increasingly difficult to move the distal end of the swivel member 18 due to the increased tightness of the connection. Further, as the lower barrel member 16 is threaded into the upper barrel member 14 bore 88 becomes axially aligned with axis through openings 38 and 40 in upper barrel member 14. When the bore 88 is thus-aligned with axis through the openings 38 and 40, pin 54 is inserted through one of the openings 38 or 40 as shown with arrow A in FIG. 3 and into the bore 88 such that the outermost end 55 of pin 54 resides in annular slot 36. With the pin in this position with outermost end 55 residing in annular slot 36, the lower barrel member 16 may be rotated relative to the upper barrel member 14, and vice versa. As described below, the pin 54 acts as a stop that prevents unintentional disassembly of the assembled mount 10.

The further the lower barrel member 16 is threaded into the upper barrel member 14, the more compressive force that is applied by lower barrel member 16 at seat 86 against ball 64, pushing the ball upwardly against O-ring 46—the swivel adapter 18 is pushed upwardly against O-ring 46 as the lower barrel member is threaded inwardly. The effect is to "tighten" the swivel adapter 18 relative to the now-assembled mount 10. Thus, with the lower barrel member 16 threaded into the upper barrel member 14 only slightly, the swivel adapter 18 is relatively easily moved relative to the mount 10 because there is relatively little friction between the ball and the O-ring. But the friction between the ball and the O-ring is increased as the lower barrel member 16 is threaded farther into the upper barrel member 14 and the swivel body 18 is thus more difficult to move relative to the mount. At the same time, since the ball mates 64 accurately with the semispherical seat 86, movement of the swivel member 18 is relatively smooth.

The distance that the lower barrel member 16 may be threaded into the upper barrel member 14 is significant enough that the two barrel members may be tightened enough that the force applied against the swivel adapter 18 effectively locks the swivel adapter in a desired position that cannot be easily moved.

With reference now to FIG. 4, with the mount 10 fully assembled the ball and socket arrangement defined by the cooperative mating orientation between ball 64 and semispherical seat 86 and the radiused inner facing walls 52 of opening 48, swivel member 18 may be readily moved relative to the interconnected upper and lower barrel members 14 and 16, respectively. With respect to the movement characterized by the two positions shown in dashed lines in FIG. 4, the swivel adapter 18 is movable between an angle of about 90 degrees. Thus, the position P1 shows the point at which junction 68 abuts the uppermost edge of walls 52 on one side of opening 48. The position P2 shows the point at which junction 68 abuts the uppermost edge of walls 52 on the opposite side of opening 48, about 180 degrees around the opening from the P1 position. The angle α through which swivel adapter 18 may move in this direction is about 90 degrees. It will be appreciated that the swivel adapter 18 is movable through an arc of 360 degrees relative to the interconnected upper and lower barrel members 14 and 16, respectively, and that the swivel adapter may be rotated around the longitudinal axis extending through the adapter. The ability to adjust the position of the swivel adapter 18 (and thus any adapter 22 and any microphone or other audio equipment attached to the adapter 22—see FIG. 1) allows a user significant flexibility to position a microphone (for instance) in a desired position.

The lower barrel member 16 may be threaded into the upper barrel member 14 until the flattened portion 87 of semispherical seat 86 is pressed against the flattened portion 66 at the lower end of ball 64. When this happens the swivel adapter 18 is locked relative to the upper and lower barrel members 14 and 16 and is immovable relative thereto. When the lower barrel member is tightened in this manner, the swivel adapter is thus fixed at the position shown in solid lines in FIG. 4 with the longitudinal axis through the swivel adapter coaxial with the longitudinal axis through the combined lower and upper barrel members.

As noted previously, the orientation between pin 54 with its outermost end 55 residing in annular slot 36 allows the lower barrel member 16 to be rotated relative to the upper barrel member 14 to adjust the frictional fit between swivel adapter 18 and the interconnection members 17 and 16. But the pin 54 also acts as a stop that prevents unintentional disassembly of the assembled mount 10. Specifically, with reference to FIG. 3 it may be seen that the outermost end 55 of pin 54 extends over the annular inner edge 39 of opening 32. Accordingly, lower barrel member 16 may not be removed from its threaded connection with upper barrel member 14 because as the lower barrel member is threaded out of the upper barrel member, pin 54 impinges on annular slot 36 which prevents the two barrel members from being disconnected from one another. The two members 14 and 16 may be taken apart either by pushing pin 54 inwardly (arrow A) until the outermost end 55 clears annular edge 39, or by removing pin 54 through one of the openings 38 or 40 when the openings are axially aligned with bore 88.

It will be readily appreciated that there are various equivalent structural features and connections between the components described above that may be used to achieve the same functional advantages and relationships described. For example, the threaded interconnection between the upper and lower barrel members that allows the upper barrel body to be moved toward and away from the lower barrel body, and vice versa, to apply pressure to or release pressure from ball 64 (i.e., threaded portions 84 and 42) may be replace by any equivalent structure for meeting the described function. As one example, a ratchet system may be used.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. Electronics equipment mount comprising:
a first body member having an open interior and an upper end with an opening into the open interior, said opening defining a first diameter;
a second body member connected to the first body member, the first and second body members movable relative to one another such that the second body member may be moved toward and away from said first body member;
a swivel member retained in the open interior of the first body member and movable relative thereto, the swivel member having an arm extending through the opening in the upper end of the first body member and adapted for attaching electronics equipment thereto, and the swivel member having a ball, wherein the ball has a second diameter that is larger than the first diameter; and
a stop for preventing the second body member from being disconnected from the first body member, said stop defined by a pin extending into a bore in said second body member and having an outer end residing in an annular slot formed in said first body member, wherein the open interior of the first body member has a third diameter that is equal to the diameter of an opening into a lower end of said first body member, and wherein the annular slot in the first body member defines a fourth diameter that is greater than the third diameter, and wherein the first body member has at least one opening into said annular slot through a wall portion of said first body member.

2. The electronics equipment mount according to claim 1 wherein the second body member defines a semispherical seat facing said ball and which mates with the ball.

3. The electronics equipment mount according to claim 2 wherein the semispherical seat defines a surface on which said ball moves.

4. The electronics equipment mount according to claim 3 in which the ball has an outer surface that defines a radius of curvature and the semispherical seat defines an equal radius of curvature.

5. The electronics equipment mount according to claim 4 in which the opening into the open interior of the first body member is defined by an annular edge having an inward face that defines a radius of curvature that is equal to the radius of curvature of the outer surface of the ball and the semispherical seat.

6. The electronics equipment mount according to claim 5 including an O-ring mounted in an annular shelf formed in the open interior of the first body member adjacent said opening into the interior of the first body member, and wherein when said second body member is moved toward said first body member, said ball is compressed against said O-ring.

7. The electronics equipment mount according to claim 6 wherein said swivel member may be locked relative to said first and second body members.

8. The electronics equipment mount according to claim 6 wherein said swivel member may be locked relative to said first and second body members by compressing said ball against said O-ring sufficiently to prevent relative movement between said ball and said first and second body members.

9. The electronics equipment mount according to claim 1 wherein said pin is insertable into said bore in said second body member through said at least one opening into said annular slot through a wall portion of said first body member when said at least one at least one opening through a wall portion of said first body member is axially aligned with an axis of said bore.

10. The electronics equipment mount according to claim 2 in which:
the connected first and second body members define a longitudinal axis extending therethrough;
the swivel member defines a longitudinal axis extending therethrough;
the ball includes a flattened portion at an end thereof, the flattened portion extending around the longitudinal axis through said swivel member;
the semispherical seat includes a flattened portion extending around the longitudinal axis through said first and second body members;
wherein when said longitudinal axis through said swivel member is axially aligned with said longitudinal axis through said first and second body members, said flattened portion on said swivel member mates with said flattened portion on said semispherical seat to prevent movement of said swivel member relative to said first and second body members.

11. Electronics equipment mount comprising:
a main body comprising a first body member interconnected with a second body member and movable relative thereto between a first position and a second position, the first body member having an open interior and an opening into the open interior through one end of the first body member, said opening having a first diameter, the second body member defining an interior semispherical seat that is in the open interior of the first body member;
wherein said first body member has an annular slot facing said second body member and said second body member has a bore formed therein aligned with said annular slot;
a swivel having a ball with a second diameter and an arm extending from said ball, said ball retained in said open interior of the first body member with the ball oriented relative to said semispherical seat so that said ball is movable on said semispherical seat and so that said arm extends through said opening through one end of the first body member; and a stop for preventing the second body member from being disconnected from the first body member, said stop defined by a pin extending into said bore in said second body member and having an outer end residing in said annular slot formed in said first body member; wherein the open interior of the first body member has a third diameter that is equal to the diameter of the opening into a lower end of said first body member, and wherein the annular slot in the first body member defines a fourth diameter that is greater than the third diameter, and wherein the first body member has at least one opening into said annular slot through a wall portion of said first body member.

12. The electronics equipment mount according to claim 11 in which the second diameter is greater than the first diameter.

13. The electronics equipment mount according to claim 12 in which said first body member is movable toward and away from said second body member, and wherein when said first body member is moved toward said second body member said semispherical seat applies pressure to said ball.

14. The electronics equipment mount according to claim 13 including a resilient O-ring retained in said first body member adjacent said opening through one end of the first body member so that when said semispherical seat applies pressure to said ball said resilient O-ring is compressed.

15. Electronics equipment mount comprising:
a main body defined by:
a first body member having an open interior and an upper end with an opening into the open interior, said opening defining a first diameter;
a second body member; and
means for connecting the first body member to the second body member so that said first and second body members are movable relative to one another such that the second body member may be moved toward and away from said first body member;
a swivel member having a ball portion in the open interior of the first body member and an arm extending from said ball portion through the opening in the upper end of the first body member, said swivel member movable relative to said main body and the ball having a second diameter that is larger than the first diameter;
compression means for compressing said swivel member between said first body member and said second body member; and
stop means for selectively preventing disassembly of said first body member from said second body member, and allowing disassembly of said first body member from said second body member, said stop means comprising a pin extending into a bore in said second body member and having an outer end residing in an annular slot formed in said first body member; wherein the open interior of the first body member has a third diameter that is equal to the diameter of the opening into a lower end of said first body member, and wherein the annular slot in the first body member defines a fourth diameter that is greater than the third diameter, and wherein the first body member has at least one opening into said annular slot through a wall portion of said first body member.

16. The electronics equipment mount according to claim 15 wherein the compression means further comprises a semispherical seat on said second body member and in said open interior of said first body member, said semispherical seat having a radius of curvature substantially equal to the radius of curvature of said ball.

* * * * *